United States Patent [19]
Matsushita et al.

[11] Patent Number: 5,478,289
[45] Date of Patent: Dec. 26, 1995

[54] TRANSMISSION CONTROL METHOD FOR A VEHICLE

[75] Inventors: Shigenori Matsushita; Shigeru Yamamoto, both of Hirakata, Japan

[73] Assignee: Kabushiki Kaisha Komatsu Seisakusho, Tokyo, Japan

[21] Appl. No.: 208,240

[22] Filed: Mar. 10, 1994

[30] Foreign Application Priority Data

Mar. 12, 1993 [JP] Japan .................................. 5-051785

[51] Int. Cl.⁶ .................................................. F16H 61/00
[52] U.S. Cl. ............................................ 475/132; 475/131
[58] Field of Search ................................ 475/131, 132, 475/134

[56] References Cited

U.S. PATENT DOCUMENTS 5,311,795  5/1994  Yoshimura et al. ................ 477/131 X

*Primary Examiner*—Charles A. Marmor
*Assistant Examiner*—Peter Kwon
*Attorney, Agent, or Firm*—Armstrong, Westerman, Hattori, McLeland & Naughton

[57] ABSTRACT

A transmission control method for a vehicle, with which torque starvation does not occur during shifting operation, and wherein shift between drive ranges in forward and reverse respectively is performed by engagement and disengagement of forward and reverse drive clutches as well as engagement and disengagement of at least first and second drive clutches, the first drive clutch to be disengaged is brought into a half-engaged state and the second drive clutch to be engaged is brought into a half-engaged state, and then the first drive clutch in a half-engaged state is fully disengaged and the second drive clutch in a half-engaged state is fully engaged.

23 Claims, 7 Drawing Sheets

5,478,289

TRANSMISSION CONTROL METHOD FOR A VEHICLE

BACKGROUND OF THE INVENTION (1) Field of the Invention

The present invention relates to a transmission control method for a vehicle, in which shifting between drive ranges in forward and reverse respectively is carried out by engaging and disengaging forward and reverse drive clutches (direction clutches) as well as at least first and second drive clutches (speed clutches), and to a transmission control method especially suitable for use in construction vehicles such as a power shovel, shovel dozer, bulldozer, wheeled loader and truck (including damped motor lorry).

(2) Description of the Related Art

When the drive speed of a vehicle of the above type is changed in the same drive direction or reverse drive direction with a conventional transmission control method, shifting between drive ranges in forward and reverse respectively is accomplished by engagement and disengagement of direction and speed clutches (in this case, these direction clutches are load clutches) in the following manner: Firstly, a speed clutch to be disengaged is disengaged, and either forward direction clutch or reverse direction clutch which is in an engaged state is disengaged. Then, a speed clutch to be engaged is engaged and either the forward direction clutch or reverse direction clutch is engaged.

SUMMARY OF THE INVENTION

However, such a conventional method, in which a changeover of drive ranges in the same or reverse drive direction is carried out by engagement and disengagement of direction clutches and speed clutches, has a disadvanage in that torque starvation tends to occur during shifting operation so that shocks occur during driving and thereby result in a rough ride for the operator. Also, the speed of the vehicle is decreased especially in shifting operation in the same direction, resulting in degradation of its operational efficiency.

The invention has been made in consideration of the foregoing problem and the object of the invention is to provide a transmission control method for a vehicle with which torque starvation does not occur during shifting operation in order that at least good ride quality can be ensured in a vehicle.

According to one aspect of the invention, there is provided a transmission control method for a vehicle which is particularly effective for cases where direction clutches are load clutches possessing better impact, wear and heat resistance than that of speed clutches, and in which shifting between drive ranges in forward and reverse respectively is carried out by engaging and disengaging first and second direction clutches as well as at least first and second speed clutches, comprising:

(a) a first step of bringing the first speed clutch to be disengaged into a half-engaged state and bringing the second speed clutch to be engaged into a half-engaged state; and (b) a second step of fully disengaging the first speed clutch which is in a half-engaged state and fully engaging the second speed clutch which is in a half-engaged state.

It is preferable in the above arrangement that static torque transmitted by the first speed clutch in a half-engaged state is larger than that transmitted by the second speed clutch in a half-engaged state.

When changing the drive Speed of the vehicle in the same drive direction, the following shifting operation is carried out in the second step: the first direction clutch to be disengaged is firstly brought into a half-engaged state, while the first speed clutch in a half-engaged state is brought into full disengagement. Thereafter, the second speed clutch in a half-engaged state is gradually and fully engaged, while the first direction clutch in a half-engaged state is again gradually and fully engaged. In this case, it is preferable that static torque transmitted by the first speed clutch in a half-engaged state is larger than that transmitted by the second speed clutch in a half-engaged state and that static torque transmitted by the second speed clutch in a half-engaged state is larger than that transmitted by the first direction clutch in a half-engaged state. Particularly, in cases where the first and second direction clutches are load clutches, as mentioned above, when the second speed clutch and the first direction clutch are gradually brought into full engagement, the engagement of the second speed clutch may be gradually performed to full engagement prior to the full engagement of the first direction clutch.

In order to change the drive speed of the vehicle in the reverse drive direction, the following shifting operation is carried out in the second step: The first direction clutch to be disengaged is fully disengaged, while the first speed clutch in a half-engaged state is fully disengaged. Thereafter, the second speed clutch which is in a half-engaged state is gradually brought into full engagement, while the second direction clutch to be engaged is gradually brought into full engagement. As mentioned above particularly in cases where the first and second direction clutches are load clutches, when the second speed clutch and the second direction clutch are gradually brought into full engagement, the engagement of the second speed clutch is preferably performed gradually to full engagement prior to the full engagement of the second direction clutch.

With the method according to the first aspect of the invention, torque starvation does not occur during shifting operation, since when shifting from the first speed clutch to the second speed clutch is carried out, after the first speed clutch to be disengaged and the second speed clutch to be engaged have been brought into a half-engaged state respectively, full disengagement of the first speed clutch in a half-engaged state is established.

According to another aspect of the invention, there is provided a transmission control method for a vehicle, which is applied to cases where the drive speed of the vehicle is changed in the same drive direction and which is particularly effective for cases where speed clutches are load clutches possessing better impact, wear and heat resistance than that of direction clutches, and in which shifting between drive ranges in forward and reverse respectively is carried out by engaging and disengaging first and second direction clutches as well as at least first and second speed clutches, comprising:

(a) a first step of bringing the first direction clutch to be disengaged into a half-engaged state and bringing the second speed clutch to be engaged into a half-engaged state; and (b) a second step of fully disengaging the first speed clutch to be disengaged, then bringing the first direction clutch, which is in a half-engaged state, back into full engagement again, and bringing the second speed clutch, which is in a half-engaged state, into full engagement.

It is preferable in the above arrangement that static torque transmitted by the first direction clutch in a half-engaged state is larger than that transmitted by the second speed clutch in a half-engaged state.

According to still another aspect of the invention, there is provided a transmission control method for a vehicle, which is applied to cases where the drive speed of the vehicle is changed in the reverse drive direction and is particularly effective for cases where speed clutches are load clutches possessing better impact, wear and heat resistance than that of direction clutches, and in which shifting between drive ranges in forward and reverse respectively is carried out by engaging and disengaging first and second direction clutches as well as at least first and second speed clutches, comprising:

(a) a first step of bringing the first direction clutch to be disengaged into a half-engaged state and bringing the second speed clutch to be engaged into a half-engaged state; and (b) a second step of fully disengaging the first speed clutch to be disengaged, while bringing the first direction clutch, which is in a half-engaged state, into full disengagement, and then fully engaging the second direction clutch while bringing the second speed clutch, which is in a half-engaged state, into full engagement.

It is preferable in the above arrangement that static torque transmitted by the first direction clutch in a half-engaged state is larger than that transmitted by the second speed clutch in a half-engaged state.

According to the first and second forms of the invention, when the first speed clutch is switched to the second speed clutch, the first speed clutch to be disengaged is brought into full disengagement, with the second speed clutch to be engaged being in a half-engaged state. This prevents torque starvation during shifting operation.

Particularly, in cases where the speed clutches are load clutches as mentioned above, when the first direction clutch and the second speed clutch in their half-engaged state are fully engaged in the second step of the second form of the invention, it is preferable that the engagement of the first direction clutch and the second speed clutch is carried out gradually and the full engagement of the first direction clutch is established prior to the full engagement of the second speed clutch. In the third form, when the second direction clutch and the second speed clutch which is in a half-engaged state are fully engaged in the second step, it is preferable that the engagements of these clutches are carried out gradually and the full engagement of the second direction clutch is established prior to the full engagement of the second speed clutch.

The first and second direction clutches may be forward and reverse drive clutches. When the first direction clutch is the forward drive clutch, the second direction clutch is the reverse drive clutch. On the other hand, when the first direction clutch is the reverse drive clutch, the second direction clutch is the forward drive clutch.

The first speed clutch and second speed clutch are different drive clutches selected from a group including at least a first drive clutch and a second drive clutch.

The first and second direction clutches and first and second speed clutches may be multiple disc clutches which can be pressed for engagement and released for disengagement by oil pressure.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to

BRIEF DESCRIPTION OF THE DRAWINGS

The present invention will become more fully understood from the detailed description given hereinbelow and accompanying drawings which are given by way of illustration only, and thus are not limitations of the present invention, and wherein:

FIG. 1 is a schematic diagram showing the structure of a transmission for use in a vehicle;

FIG. 2 is a characteristic diagram showing a shift control for shifting from a first drive range to a second drive range in the same drive direction of the vehicle;

FIG. 3 is a characteristic diagram showing a shift control for shifting from the second drive range to the first drive range in the reverse drive direction of the vehicle;

FIG. 4 is a diagram showing the condition of power transmission when the vehicle is placed in the first forward drive range;

FIG. 5 is a diagram showing the condition of power transmission when the vehicle is placed in the second forward drive range;

FIG. 6 is a diagram showing the condition of power transmission when the vehicle is placed in the first reverse drive range;

FIG. 7 is a characteristic diagram similar to FIG. 2, showing a shift control for shifting from a first drive range to a second drive range in the same drive direction of the vehicle;

FIG. 8 is a characteristic diagram similar to FIG. 3, showing a shift control for shifting from a second drive range to a first drive range in the reverse drive direction of the vehicle.

DESCRIPTION OF THE PREFERRED EMBODIMENTS

Figure 1:
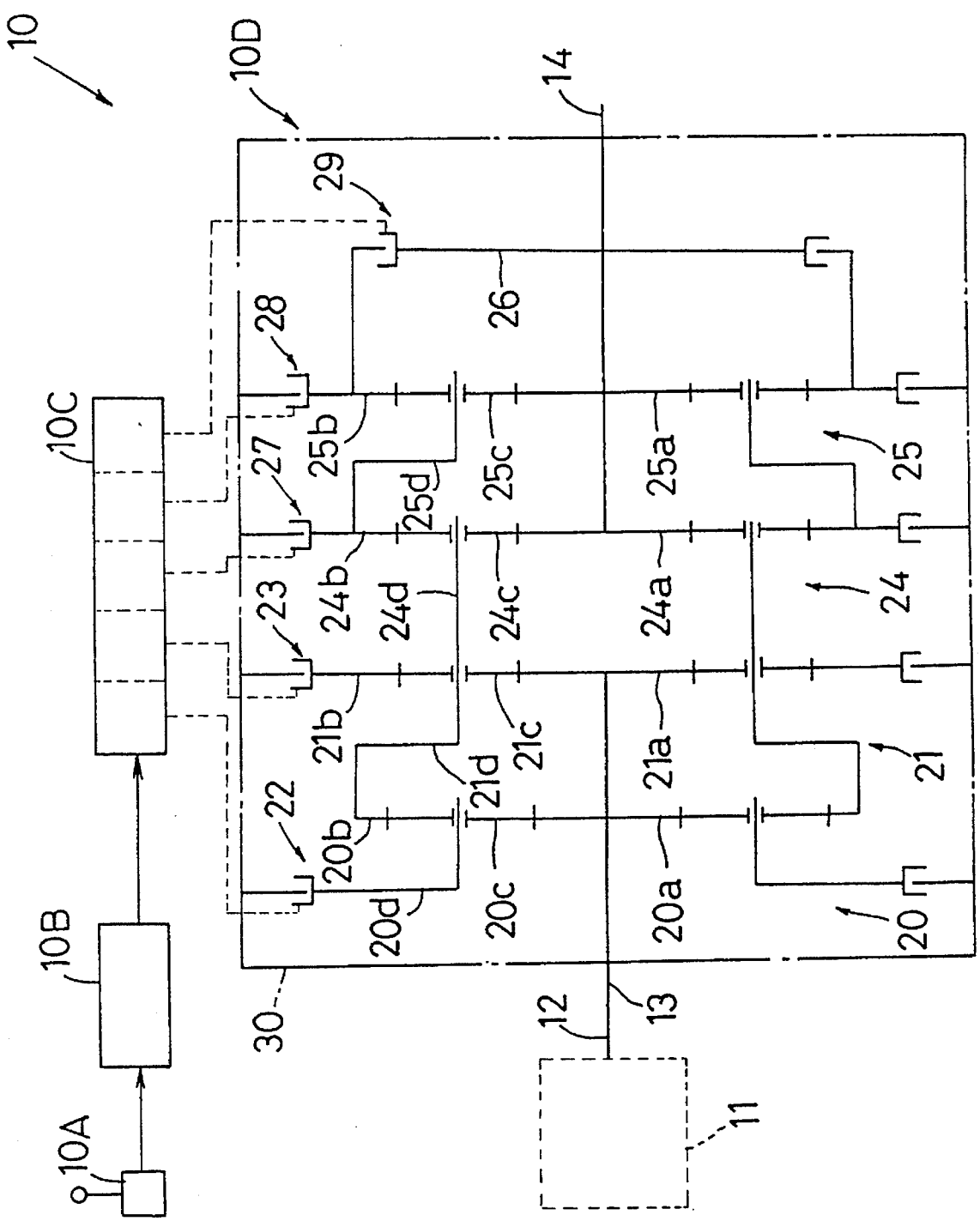
FIGS. 1 to 6 are for explaining a first form of the transmission control method for a vehicle of the invention.

Referring now to the drawings, preferred embodiments of a transmission control method for a vehicle according to the present invention will be hereinafter described. Firstly, there will be given an explanation on cases where forward and reverse drive clutches are load clutches.

FIG. 1 schematically shows the structure of a transmission 10 for providing three drive ranges in forward and reverse respectively. The transmission 10 is composed of (i) a speed lever 10A operated by the operator; (ii) a controller 10B for performing a shift control, according to operation of the speed lever 10A; (iii) an ECMV (Electric Control Modulating Valve; see U.S. patent application Ser. Nos. 534,737 (1990), 965,622 (1990), 775,994 (1991) and 876,700 (1990)) 10C of an electromagnetic solenoid valve hydraulically controlled according to instructions sent from the controller 10B; and (iv) a gear mechanism 10D including multiple disc clutches which are pressed for engagement and released for disengagement by controlling oil pressure with the ECMV 10C. An engine output shaft 12 of an engine 11 is integrally, coaxially coupled to an input shaft 13 of the gear mechanism 10D so that the rotary driving force of the engine 11 is transmitted to the gear mechanism 10D through the engine output shaft 12 and the input shaft 13. In the gear mechanism 10D, the rotary driving force is put into one of the three drive ranges in forward and reverse respectively by shifting gears to transmit to an output shaft 14.

The gear mechanism 10D will be described in detail. The input shaft 13 is connected to a planetary reverse drive gear train 20 and a planetary forward drive gear train 21 which are of the single planetary type and aligned in this order from the left to the right of the drawing in parallel with the axis of the input shaft 13. The planetary reverse drive gear train 20 includes (i) a sun gear 20a integrally formed with the input shaft 13; (ii) a ring gear 20b positioned outside the sun gear 20a; (iii) a planetary gear 20c which is interposed between the gears 20a and 20b to mesh therewith; and (iv) a planetary carrier 20d for the planetary gear 20c, the rotation of which can be stopped by pressing a hydraulic reverse drive clutch 22 for engagement. The planetary forward drive gear train 21 includes (i) a sun gear 21a integrally formed with the input shaft 13; (ii) a ring gear 21b which is positioned outside the sun gear 21a and the rotation of which can be stopped by pressing a hydraulic forward drive clutch 23 for engagement; (iii) a planetary gear 21c which is interposed between the gears 21a and 21b to mesh therewith; and (iv) a planetary carrier 21d for the planetary gear 21c, which is integral with the ring gear 20b of the planetary reverse drive gear train 20.

The output shaft 14 is positioned on the elongation of the input shaft 13, having coaxial relationship with the input shaft 13. The output shaft 14 is connected to a planetary third drive gear train 24, a planetary second drive gear train 25 and a first drive disc 26 for the first drive range, which are aligned in this order from the left to the right of the drawing. It is to be noted that the planetary third drive gear train 24 and the planetary second drive gear train 25 are of the single planetary type. The planetary third drive gear train 24 includes (i) a sun gear 24a integral with the output shaft 14; (ii) a ring gear 24b which is positioned outside the sun gear 24a and the rotation of which can be stopped by pressing a hydraulic third drive clutch 27 for engagement; (iii) a planetary gear 24c which is interposed between the gears 24a and 24b to mesh therewith; and (iv) a planetary carrier 24d for the planetary gear 24c, which is integrally coupled to the planetary carrier 21d of the planetary forward drive gear train 21. The planetary second drive gear train 25 includes (i) a sun gear 25a integral with the output shaft 14; (ii) a ring gear 25b which is positioned outside the sun gear 25a and the rotation of which can be stopped by pressing a hydraulic second drive clutch 28 for engagement; (iii) a planetary gear 25c which is interposed between the gears 25a and 25b to mesh therewith; and (iv) a planetary carrier 25d for the planetary gear 25c, which is integral with the ring gear 24b of the planetary third drive gear train 24. The first drive disc 26 is integral with the output shaft 14 and its rotation can be stopped by pressing a hydraulic first drive clutch 29 for engagement, the clutch 29 being integrally formed with the ring gear 25b of the planetary second drive gear train 25.

The gear mechanism 10D is housed in a case 30 indicated by chain line in FIG. 1 and the case 30 is integrally formed with the hydraulic reverse drive clutch 22, the hydraulic forward drive clutch 23, the hydraulic third drive clutch 27 and the hydraulic second drive clutch 28. Each of the direction clutches (i.e., the hydraulic reverse drive clutch 22 and the hydraulic forward drive clutch 23) comprises a multiple disc clutch having many discs, compared with the speed clutches (i.e., the hydraulic third drive clutch 27, the hydraulic second drive clutch 28 and the hydraulic first drive clutch 29). Therefore, the impact, wear and heat resistance of the direction clutches formed as load clutches is superior to that of the speed clutches.

There will be explained hereinbelow the characteristics of shift controls between the drive ranges in forward and reverse respectively carried out in the transmission 10. Concretely, a shift control is achieved by the engagement and disengagement of the clutches 22, 23 and 27 to 29 which are respectively pressed for engagement and released for disengagement by controlling all pressure with the ECMV 10 through the controller 10B according to operation of the speed lever 10A by the operator.

Figure 2:
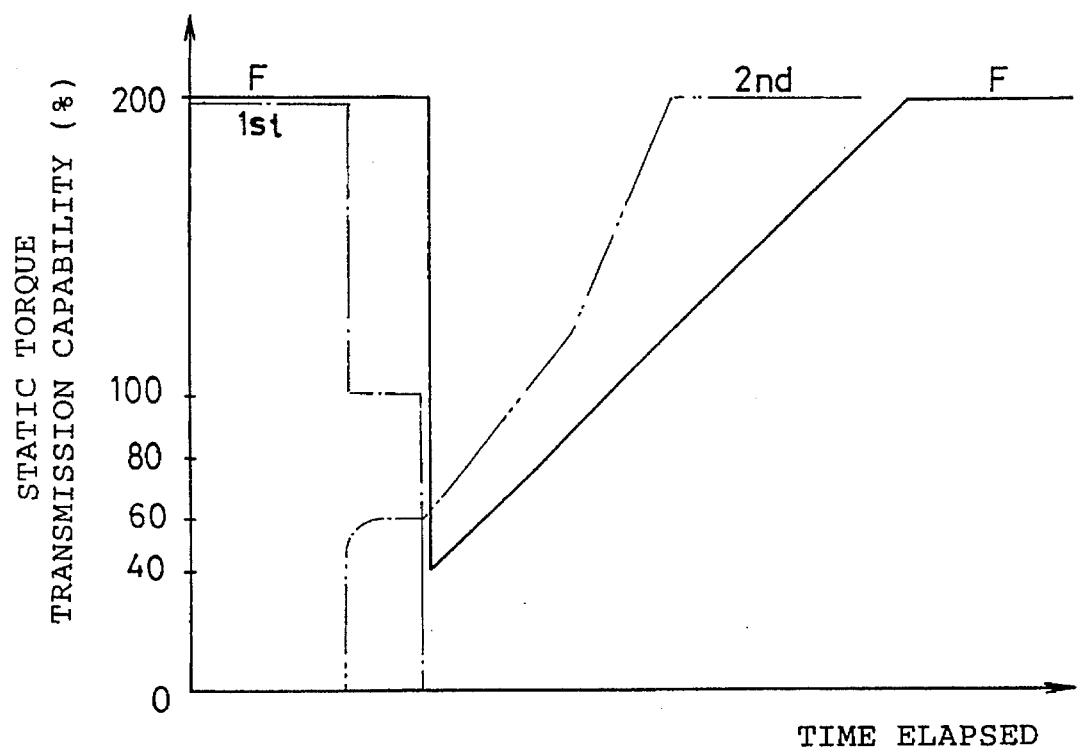
Figure 3:
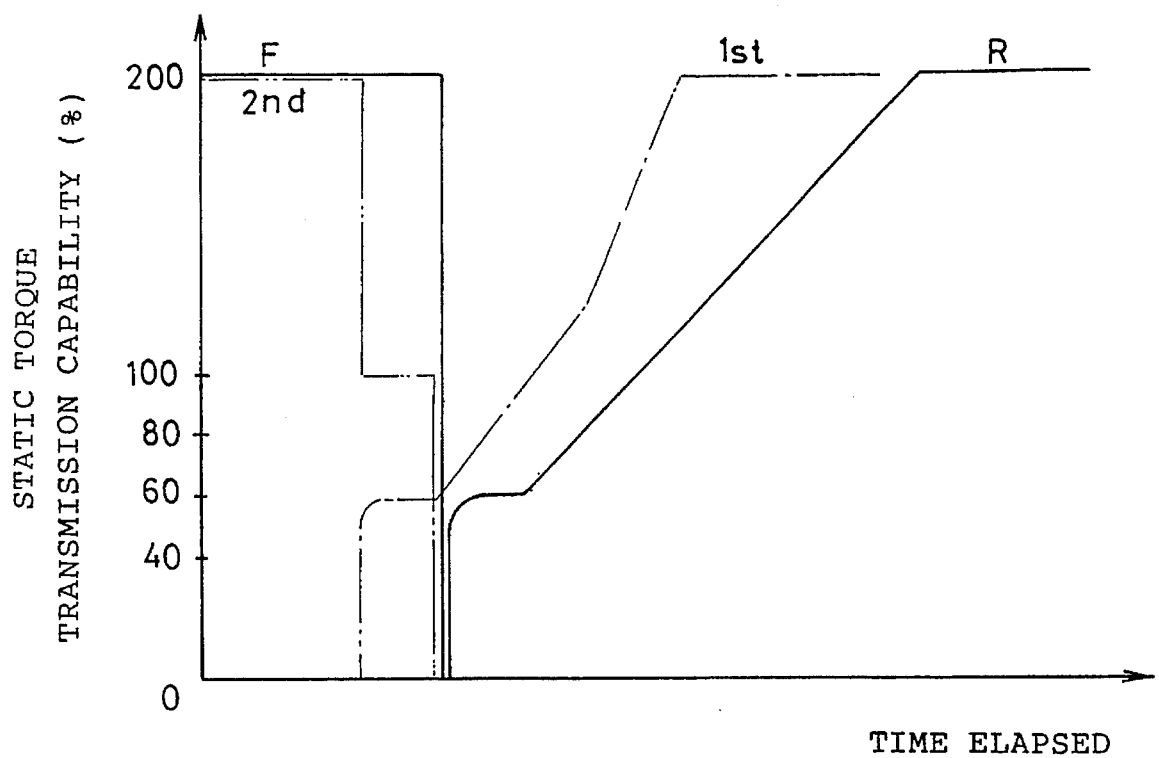

Reference is made to FIGS. 2 and 3 for describing (I) a case where the drive speed is shifted from the first forward drive range (F1) to the second forward drive range (F2) in the same drive direction, and (II) a case where the drive speed is shifted from the second forward drive range (F2) to the first reverse drive range (R1) in the reverse drive direction.

(I) Where the drive speed is shifted in the same drive direction, from the first forward drive range (F1) to the second forward drive range (F2) (see FIG. 2)

Figure 4:
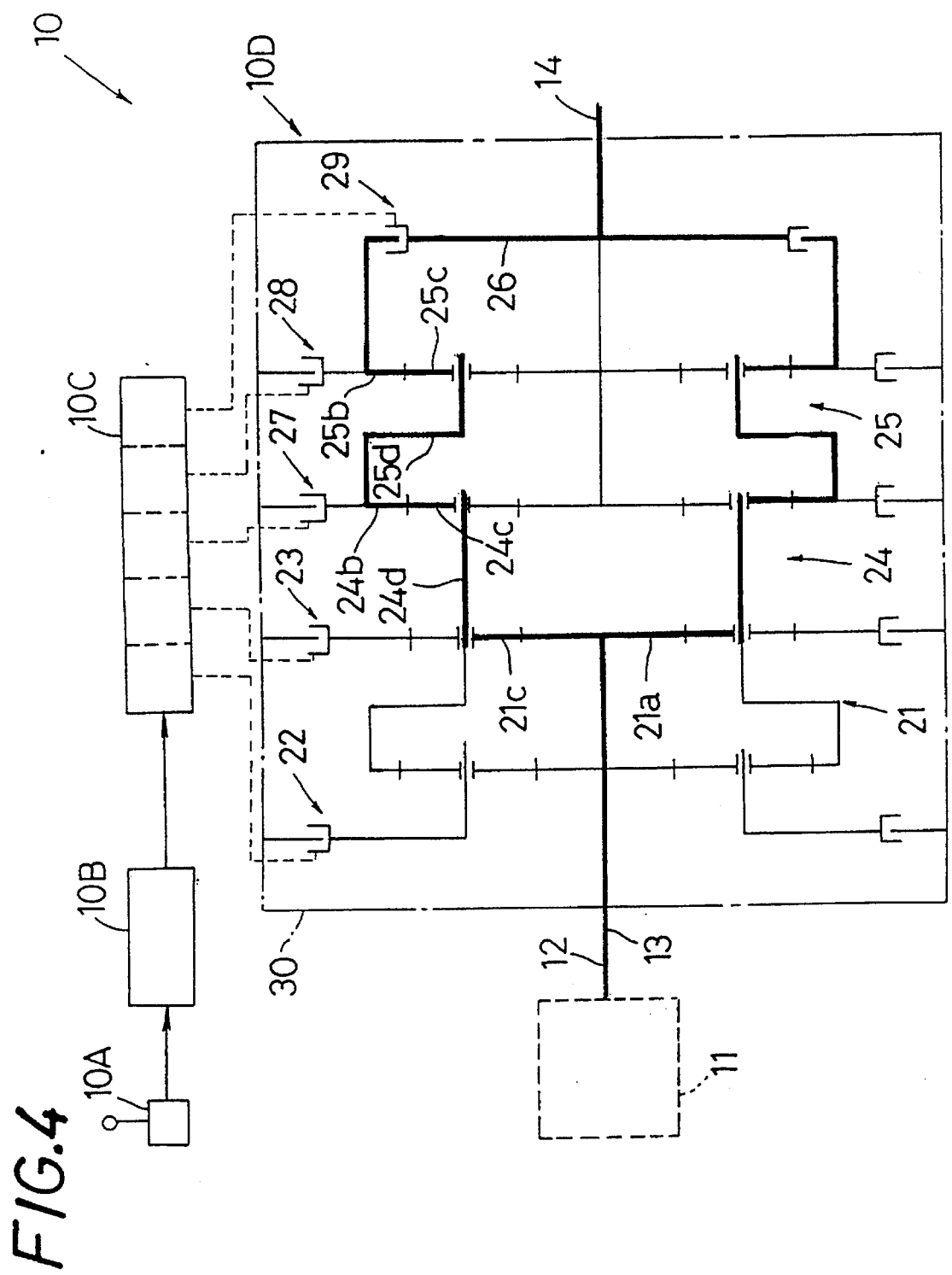

When the first forward drive range is selected, the hydraulic forward drive clutch 23 and the hydraulic first drive clutch 29 are fully engaged by pressing, while the hydraulic reverse drive clutch 22, the hydraulic third drive clutch 27 and the hydraulic second drive clutch 28 are fully disengaged by releasing. In this situation, the rotary driving force which has been transmitted from the engine 11 to the input shaft 13 through the engine output shaft 12 is transmitted to the output shaft 14, after passing through (i) the sun gear 21a and the planetary gear 21c in the planetary forward drive gear train 21; (ii) the planetary carrier 24d, the planetary gear 24c and the ring gear 24b in the planetary third drive gear train 24; (iii) the planetary carrier 25d, the planetary gear 25c and the ring gear 25b in the planetary second drive gear train 25; and (iv) the first drive disc 26, in this order (see FIG. 4).

When the first forward drive range is selected, if the operator operates the speed lever 10A to shift from the first forward drive range to the second forward drive range, the following shift control will be performed.

Firstly, the hydraulic first drive clutch 29 to be disengaged is released by decreasing its oil pressure to immediately bring the clutch 29 into a half-engaged state where the clutch 29 exhibits about 100% of its static torque power transmission capability with which slip occurs against a shock. In the meantime, the hydraulic second drive clutch 28 to be engaged is pressed by increasing its oil pressure to bring the clutch 28 into a half-engaged state where the static torque power transmission capability exhibited is about 60%.

Thereafter, the hydraulic forward drive clutch 23 is released by decreasing its oil pressure to bring the clutch 23 into a half-engaged state where the clutch 23 exhibits about 40% of its static torque power transmission capability, while oil pressure for the hydraulic first drive clutch 29 which is in a half-engaged state is further decreased so that the clutch 29 is released for full disengagement. Sequentially, the hydraulic second drive clutch 28 in a half-engaged state exhibiting about 60% of the static torque transmission capability and the hydraulic forward drive clutch 23 in a half-engaged state exhibiting about 40% of the static torque transmission capability are gradually pressed by increasing their oil pressure in such a manner that the full engagement of the hydraulic second drive clutch 28 is established prior to the full engagement of the hydraulic forward drive clutch 23, so that these clutches 23 and 28 are both brought into full engagement where the static torque transmission capability exhibited is about 200% with which no slip occurs against a shock.

The above described shift control for drive ranges causes no torque starvation during the shifting operation, and therefore decreases in the drive speed caused by torque starvation can be prevented during the shifting operation. Moreover, since shocks do not occur during driving, good ride can be ensured.

Figure 5:
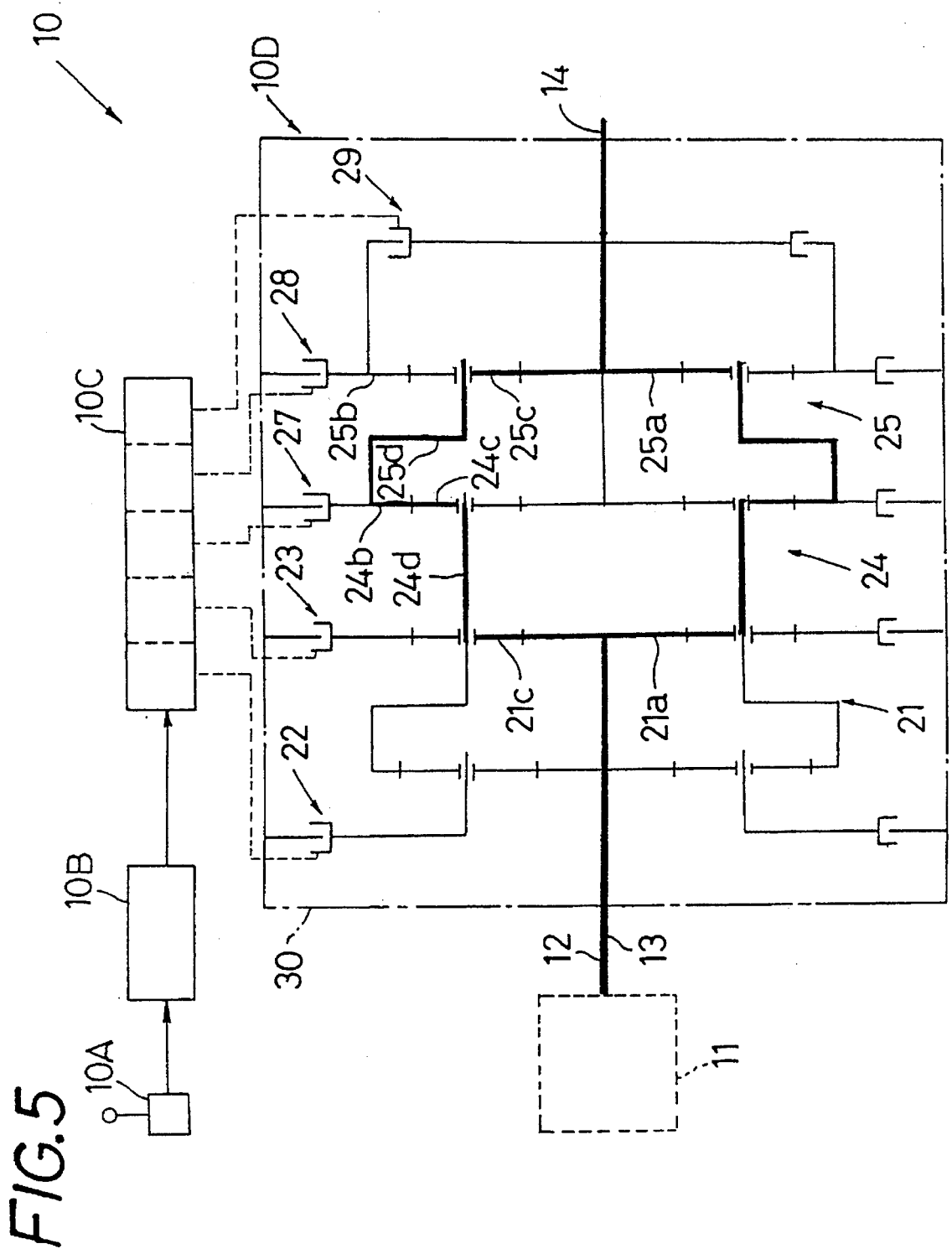

Shift from the first forward drive range to the second forward drive range is thus performed, and during the time the second forward drive range is selected, the rotary driving force which has been transmitted from the engine 11 to the input shaft 13 through the engine output shaft 12 is transmitted to the output shaft 14, after passing through (i) the sun gear 21*a* and the planetary gear 21*c* in the planetary forward drive gear train 21; (ii) the planetary carrier 24*d*, the planetary gear 24*c* and the ring gear 24*b* in the planetary third drive gear train 24; and (iii) the planetary carrier 25*d*, the planetary gear 25*c* and the sun gear 25*a* in the planetary second drive gear train 25, in this order (see FIG. 5).

(II) Where the drive speed is shifted in the reverse drive direction, from the second forward drive range (F2) to the first reverse drive range (R1) (see FIG. 3)

When the second forward drive range is selected, if the operator operates the speed lever 10A to shift from the second forward drive range to the first reverse drive range, the following shift control will be performed.

Firstly, the hydraulic second drive clutch 28 to be disengaged is released by decreasing its oil pressure to bring the clutch 28 into a half-engaged state where the clutch 28 exhibits about 100% of its static torque power transmission capability with which slip occurs against a shock. In the meantime, the hydraulic first drive clutch 29 to be engaged is pressed by increasing its oil pressure to bring the clutch 29 into a half-engaged state where the static torque power transmission capability exhibited is about 60%.

Thereafter, oil pressure for the hydraulic forward drive clutch 23 to be disengaged is decreased until the clutch 23 is released and brought into full disengagement, while oil pressure for the hydraulic second drive clutch 28 which is in a half-engaged state is further decreased so that the clutch 28 is brought into full disengagement. Sequentially, the hydraulic first drive clutch 29 in a half-engaged state exhibiting about 60% of the static torque transmission capability and the hydraulic reverse drive clutch 22 to be engaged are gradually pressed by increasing their oil pressure. Especially the oil pressure of the hydraulic reverse drive clutch 22 is raised so that no torque starvation is caused. Thus, the full engagement of the hydraulic first drive clutch 29 is established prior to the full engagement of the hydraulic reverse drive clutch 22, so that these clutches 22 and 29 are both brought into full engagement where the static torque transmission capability exhibited is about 200% with which no slip occurs against a shock.

Like the above mentioned case (I) where the drive speed is shifted in the same drive direction, the above described shift control for drive ranges causes no torque starvation during the shifting operation so that the occurrence of shocks can be prevented.

Figure 6:
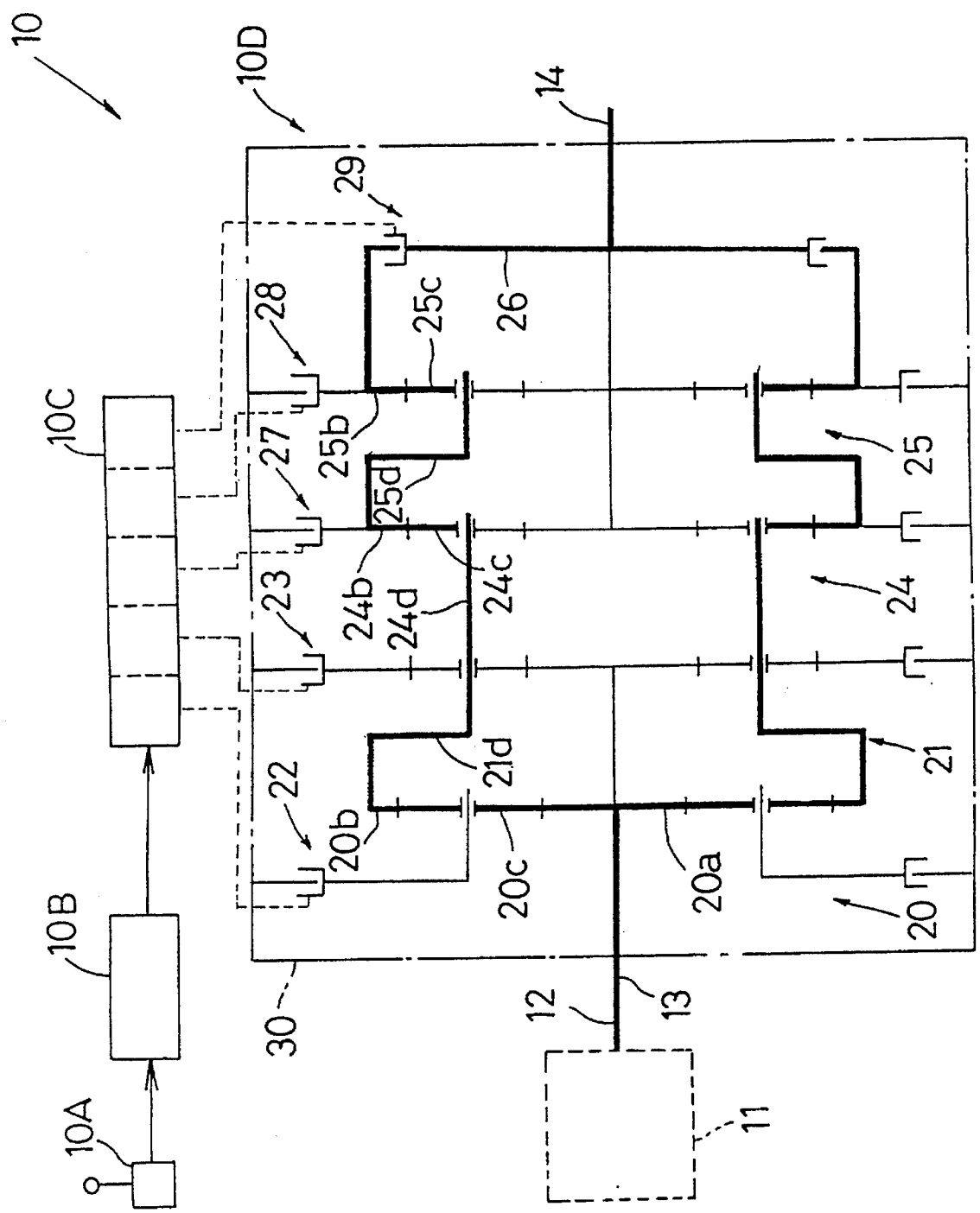

Shift from the second forward drive range to the first reverse drive range is thus performed, and during the time the first reverse drive range is selected, the rotary driving force which has been transmitted from the engine 11 to the input shaft 13 through the engine output shaft 12 is transmitted to the output shaft 14, after passing through (i) the sun gear 20*a*, planetary gear 20*c* and the ring gear 20*b* in the planetary reverse drive gear train 20; (ii) the planetary carrier 21*d* in the planetary forward drive gear train 21, (iii) the planetary carrier 24*d*, the planetary gear 24*c* and the ring gear 24*b* in the planetary third drive gear train 24; (iv) the planetary carrier 25*d*, the planetary gear 25*c* and the ring gear 25*b* in the planetary second drive gear train 25; and (v) the first drive disc 26, in this order (see FIG. 6).

Finally, there will be given an explanation on a second embodiment which differs from the first embodiment in that each of the speed clutches (i.e., the hydraulic third drive clutch 27, the hydraulic second drive clutch 28, and the hydraulic first drive clutch 29) comprises a multiple disc clutch having many discs, compared with the direction clutches (i.e., the hydraulic reverse drive clutch 22 and the hydraulic forward drive clutch 23), and therefore, the impact, wear and heat resistance of the speed clutches formed as load clutches is superior to,that of the direction clutches. Except for the above point, the second embodiment has a construction similar to that of the first embodiment, and therefore an explanation on the same points will be omitted.

As in the first embodiment, the following two cases will be described with reference to FIGS. 7 and 8 in this embodiment: (I) a case where the drive speed is shifted from the first forward drive range (F1) to the second forward drive range (F2) in the same drive direction, and (II) a case where the drive speed is shifted from the second forward drive range (F2) to the first reverse drive range (R1) in the reverse drive direction. In these cases, the shift control is achieved by engagement and disengagement of the clutches 22, 23 and 27 to 29 which are respectively pressed for engagement and released for disengagement by controlling oil pressure with the speed lever 10A of the transmission 10 operated by the operator.

Figure 7:
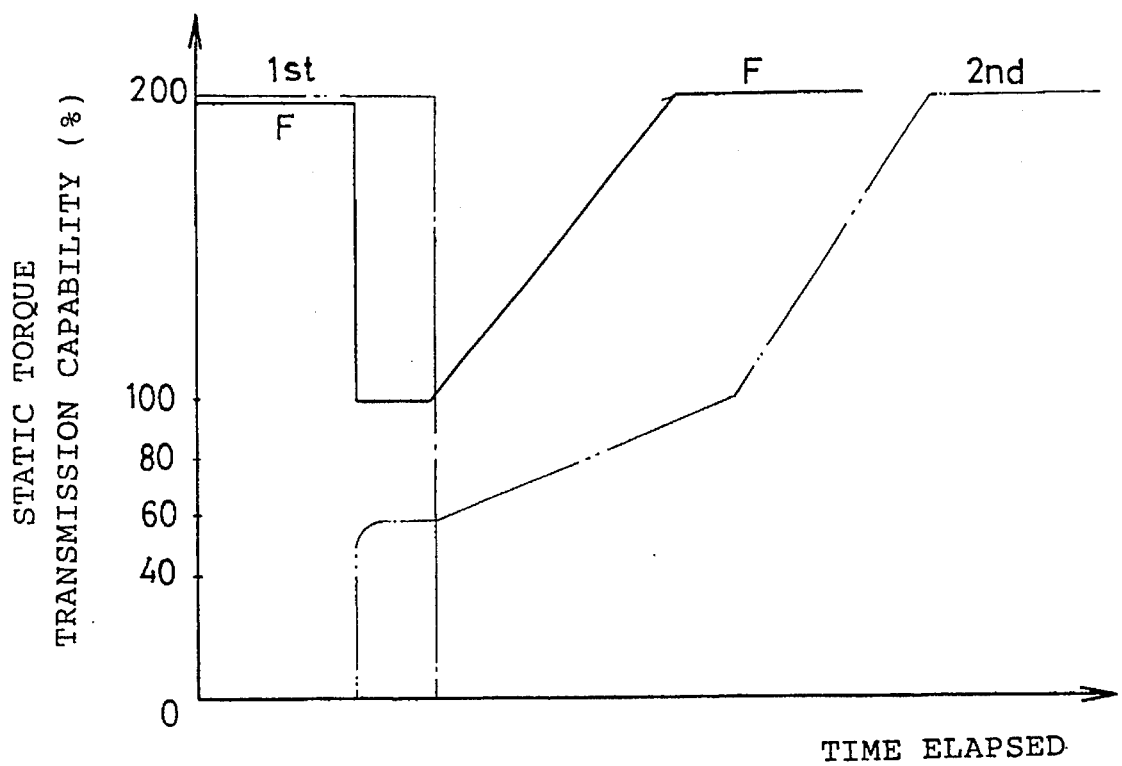
FIGS. 7 to 8 are for explaining second and third forms of the transmission control method for a vehicle of the invention.

(I) Where the drive speed is shifted in the same drive direction, from the first forward drive range (F1) to the second forward drive range (F2) (see FIG. 7)

First, the hydraulic forward drive clutch 23 is released by decreasing its oil pressure to immediately bring the clutch 23 into a half-engaged state where the clutch 23 exhibits about 100% of its static torque power transmission capability, while the hydraulic second drive clutch 28 to be engaged is pressed by increasing its oil pressure to bring the clutch 28 into a half-engaged state where the static torque power transmission capability exhibited is about 60%.

Thereafter, oil pressure for the hydraulic first drive clutch 29 to be disengaged is released until the clutch 29 is fully disengaged. Sequentially, the hydraulic forward drive clutch 23 in a half-engaged state exhibiting about 100% of the static torque transmission capability and the hydraulic second drive clutch 28 in a half-engaged state exhibiting about 60% of the static torque transmission capability are gradually pressed by increasing their oil pressure in such a manner that the full engagement of the hydraulic forward drive clutch 23 is established prior to the full engagement of the hydraulic second drive clutch 28, so that these clutches 23 and 28 are both brought into full engagement where the static torque transmission capability exhibited is about 200%.

Figure 8:
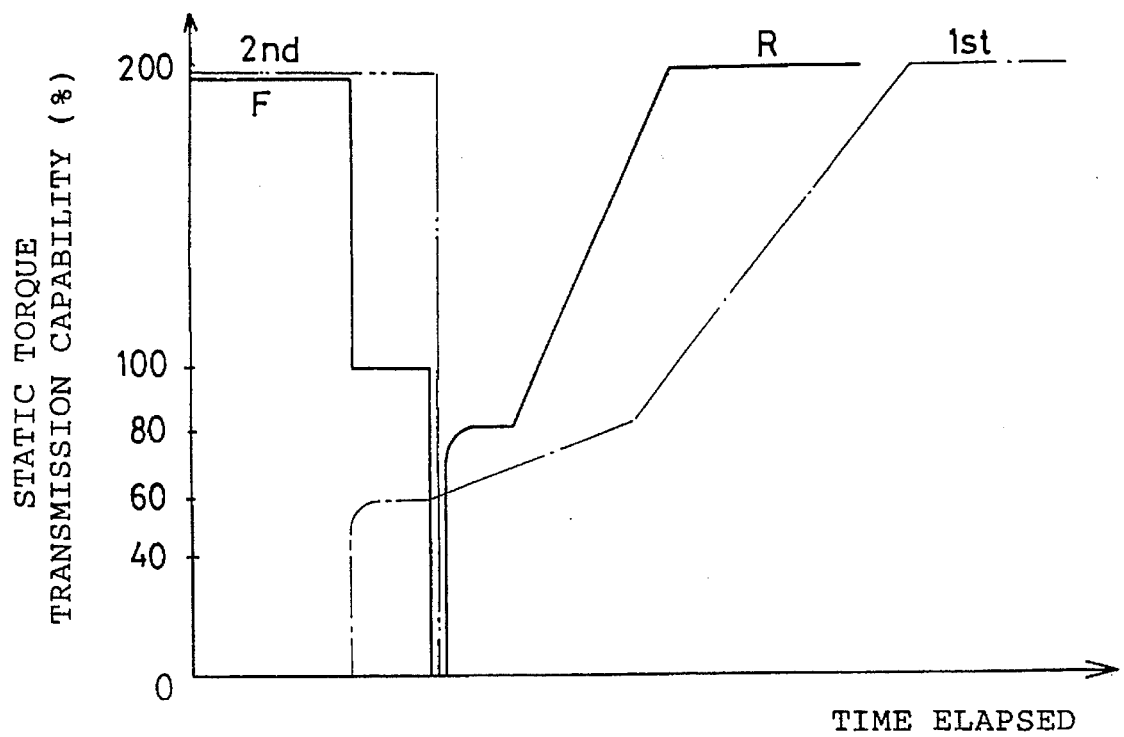

(II) Where the drive speed is shifted in the reverse drive direction, from the second forward drive range (F2) to the first reverse drive range (R1) (see FIG. 8)

First, the hydraulic forward drive clutch 23 to be disengaged is released by decreasing its oil pressure to bring the clutch 23 into a half-engaged state where the clutch 23 exhibits about 100% of its static torque power transmission capability, while the hydraulic first drive clutch 29 to be engaged is pressed by increasing its oil pressure to bring the clutch 29 into a half-engaged state where the static torque power transmission capability exhibited is about 60%.

Thereafter, the hydraulic second drive clutch 28 to be disengaged is released by decreasing its oil pressure until the clutch 28 is fully disengaged, while oil pressure for the hydraulic forward drive clutch 23 which is in a half-engaged state is further decreased so that the clutch 23 is released for full disengagement. Sequentially, the hydraulic reverse drive clutch 22 to be engaged and the hydraulic first drive clutch 29 in a half-engaged State exhibiting about 60% of the static torque transmission capability are gradually pressed by increasing their oil pressure. Especially the oil pressure of the hydraulic reverse drive clutch 22 is raised so that no torque starvation is caused, Thus, the full engagement of the hydraulic reverse drive clutch 22 is established prior to the full engagement of the hydraulic first drive clutch 29, so that these clutches 22 and 29 are both brought into full engagement where the static torque transmission capability exhibited is about 200%.

The shift control of this embodiment is carried out similarly to that of the first embodiment except for the above point. Also, in the above second embodiment, other features are the same as in the first embodiment.

Although the shift controls in the foregoing embodiments have been particularly described with the instances where the first forward drive range is shifted to the second forward drive range and where the second forward drive range is shifted to the first reverse drive range, it is obvious that the shift control between two drive ranges selected from the first, second and third drive ranges in forward and reverse respectively is carried out in the same manner.

Obviously, the transmission does not need to provide three drive ranges in forward and reverse respectively as has been described in the forgoing embodiments, since the transmission control method for a vehicle of the invention can be applied to a transmission which provides at least two drive ranges in forward and reverse respectively.

Although the first embodiment has been described in which the direction clutches are load clutches and the second embodiment has been described in which the speed clutches are load clutches. However, if the direction and speed clutches have an equal degree of impact, wear and heat resistance, either of them may be selected as the load clutch.

Figure 9:
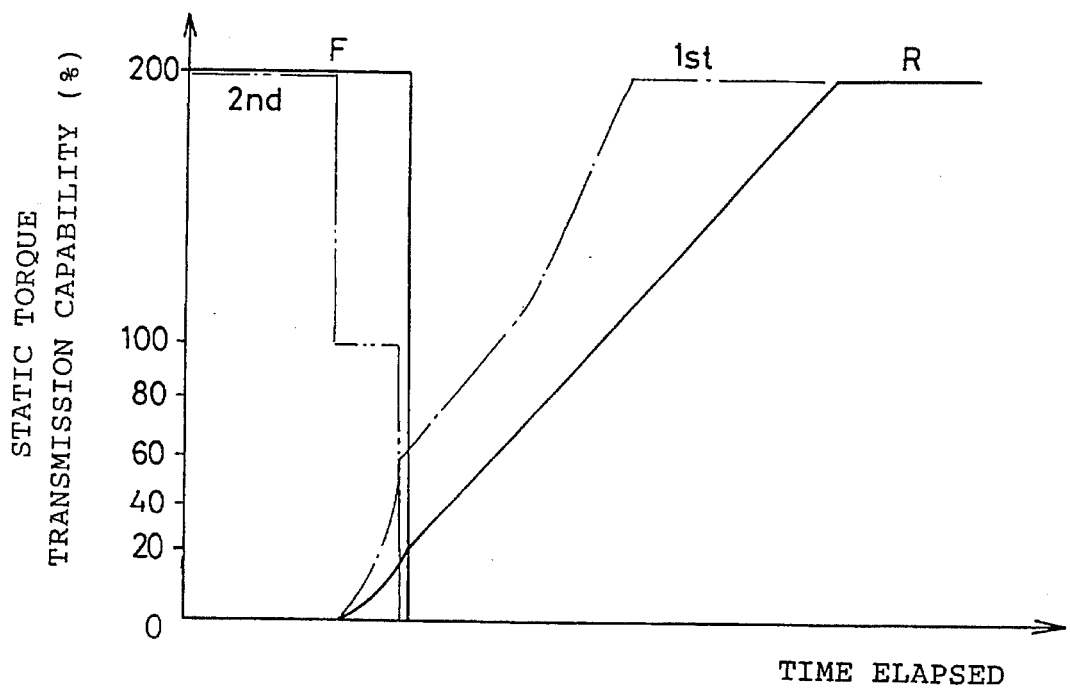
FIGS. 9 and 10 are characteristic diagrams which are similar to FIGS. 3 and 8 respectively and which show shift controls for shifting from a second drive range to a first drive range in the reverse drive direction of the vehicle, according to modified examples.
Figure 10:
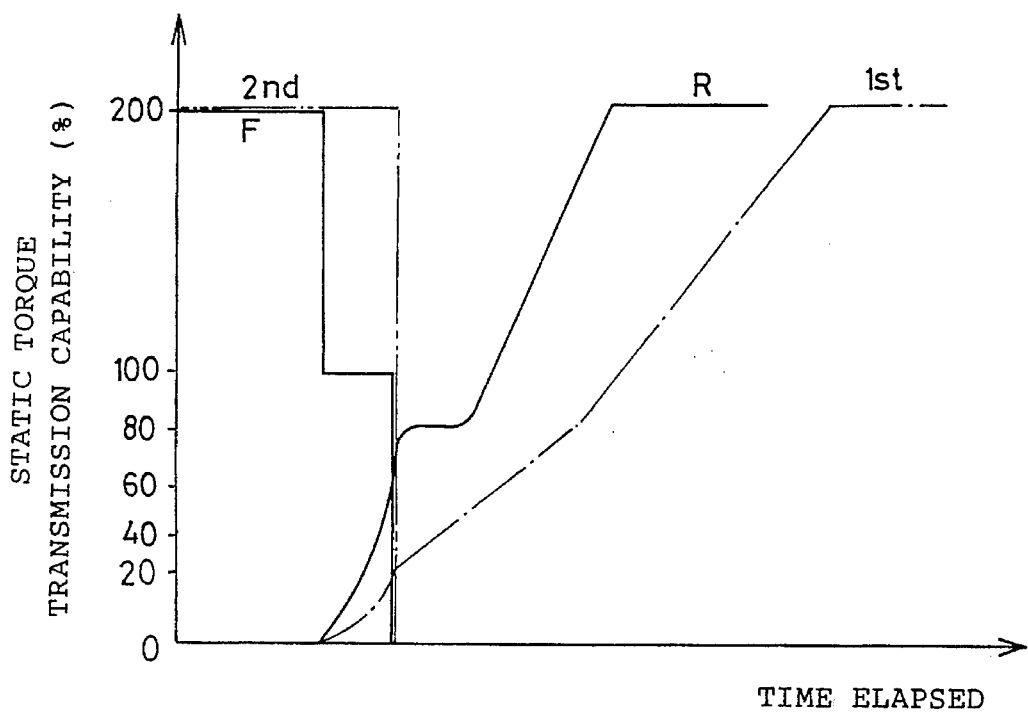

In the first embodiment, when the drive speed is shifted in the reverse drive direction, the shift control is carried out as shown in FIG. 3. Specifically, the hydraulic first drive clutch 29 to be engaged is rapidly brought into its half-engaged state where the clutch 29 exhibits about 60% of the static torque transmission capability and the hydraulic reverse drive clutch 22 to be engaged is rapidly brought into its half-engaged state where the clutch 22 exhibits about 60% of the static torque transmission capability, after the full disengagement of the hydraulic forward drive clutch 23 and the hydraulic second drive clutch 28. However, it is also possible to arrange the shift control as shown in FIG. 9 according to which the hydraulic first drive clutch 29 to be engaged is gradually brought into its half-engaged state where the clutch 29 exhibits about 60% of the static torque transmission capability and the engagement of the hydraulic reverse drive clutch 22 is gradually carried out together with the engagement of the hydraulic first drive clutch 29, before the hydraulic forward drive clutch 23 and the hydraulic second drive clutch 28 are fully disengaged. Further, when the drive speed is shifted in the reverse drive direction in the second embodiment, the shift control is carried out as shown in FIG. 8. Specifically, the hydraulic reverse drive clutch 22 to be engaged is rapidly brought into its half-engaged state where the clutch 22 exhibits about 80% of the static torque transmission capability and the hydraulic first drive clutch 29 to be engaged is rapidly brought into its half-engaged state where the clutch 29 exhibits about 60% of the static torque transmission capability. Instead of such an arrangement, the shift control could be performed as shown in FIG. 1O according to which the hydraulic reverse drive clutch 22 to be engaged may be gradually brought into its half-engaged state where the static torque transmission capability exhibited is about 80% and the hydraulic first drive clutch 29 may be gradually engaged. In the above modified examples, other features are the same as the first and second embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission control method for a vehicle, in which shifting between drive ranges in forward and reverse respectively is carried out by engaging and disengaging first and second direction clutches as well as at least first and second speed clutches, comprising:

(a) a first step of bringing the first speed clutch to be disengaged into a half-engaged state and bringing the second speed clutch to be engaged into a half-engaged state, wherein static torque transmitted by the first speed clutch in a half-enlarged state is greater than the static torque transmitted by the second speed clutch in a half-engaged state; and (b) a second step of fully disengaging the first speed clutch which is in a half-engaged sate immediately when the gradual and full engagement of the second speed clutch which is in a half-engaged state begins.

2. A transmission control method for a vehicle, in which shifting between drive ranges in forward and reverse, respectively, is carried out by engaging and disengaging first and second direction clutches as well as at least first and second speed controls, comprising:

(a) a first step of bringing the first speed clutch to be disengaged into a half-engaged state and bringing the second speed clutch to be engaged into a half-engaged state; and (b) a second step of fully disengaging the first speed clutch which is in a half-engaged state and fully engaging the second speed clutch which is in a half-engaged state, wherein when changing the drive speed of the vehicle in the same drive direction, in said second step, the first direction clutch is firstly brought in a half-engaged state, while the first speed clutch in a half-engaged state is brought into full disengagement, and thereafter, the second speed clutch in a half-engaged state is gradually and fully engaged, while the first direction clutch in a half engaged state is again gradually and fully engaged.

3. The transmission control method for a vehicle as claimed in claim 2, wherein static torque transmitted by the first speed clutch in a half-engaged state is larger than that transmitted by the second speed clutch in a half-engaged state, and static torque transmitted by the second speed clutch in a half-engaged state is larger than that transmitted by the first direction clutch in a half-engaged state.

4. The transmission control method for a vehicle as claimed in claim 2 or 3, wherein when the second speed clutch and the first direction clutch are gradually brought into full engagement, the full engagement of the second speed clutch is gradually established prior to the full engagement of the first direction clutch.

5. A transmission control method for a vehicle, in which shifting between drive ranges in forward and reverse, respectively, is carried out by engaging and disengaging first and second direction clutches as well as at least first and second speed clutches, comprising:

(a) a first step of bringing the first speed clutch to be disengaged into a half-engaged state and bringing the second speed clutch to be engaged into a half-engaged state; and (b) a second step of fully disengaging the first speed clutch which is in a half-engaged sate and fully engaging the second speed clutch which is in a half-engaged state, wherein in order to change the drive speed of the vehicle in the reverse drive direction, in said second step, the first direction clutch to be disengaged is fully disengaged, while the first speed clutch in a half-engaged state is fully disengaged, and thereafter, the second speed clutch which is in a half-engaged state is gradually brought into full engagement, while the second direction clutch to be engaged is gradually brought into full engagement.

6. The transmission control method for a vehicle as claimed in claim 5, wherein when the second speed clutch and the second direction clutch are gradually brought into full engagement, the full engagement of the second speed clutch is established prior to the full engagement of the second direction clutch.

7. A transmission control method for a vehicle, which is applied to cases where the drive speed of the vehicle is changed in the same drive direction, and in which shifting between drive ranges in forward and reverse respectively is carried out by engaging and disengaging first and second direction clutches as well as at least first and second speed clutches, comprising:

(a) a first step of bringing the first direction clutch to be disengaged into a half-engaged state and bringing the second speed clutch to be engaged into a half-engaged state; and (b) a second step of fully disengaging the first speed clutch to be disengaged, then bringing the first direction clutch, which is in a half-engaged state, back into full engagement again, and bringing the second speed clutch, which is in a half-engaged state, into full engagement.

8. The transmission control method for a vehicle as claimed in claim 7, wherein static torque transmitted by the first direction clutch in a half-engaged state is larger than that transmitted by the second speed clutch in a half-engaged state.

9. The transmission control method for a vehicle as claimed in claim 8, wherein when the first direction clutch in a half-engaged state and the second speed clutch in a half-engaged state are brought into full engagement in the second step, both of the clutches are engaged gradually, and the full engagement of the first direction clutch is established prior to the full engagement of the second speed clutch.

10. The transmission control method for a vehicle as claimed in claim 2, 3, 7, 8 or 9, wherein the first direction clutch is either a forward drive clutch or reverse drive clutch.

11. A transmission control method for a vehicle, which is applied to cases where the drive speed of the vehicle is changed in the reverse drive direction and in which shifting between drive ranges in forward and reverse respectively is carried out by engaging and disengaging first and second direction clutches as well as at least first and second speed clutches, comprising:

(a) a first step of bringing the first direction clutch to be disengaged into a half-engaged state and bringing the second speed clutch to be engaged into a half-engaged state; and (b) a second step of fully disengaging the first speed clutch to be disengaged while bringing the first direction clutch, which is in a half-engaged state, into full disengagement, and then fully engaging the second direction clutch while bringing the second speed clutch, which is in a half-engaged state, into full engagement.

12. The transmission control method for a vehicle as claimed in claim 11, wherein static torque transmitted by the first direction clutch in a half-engaged state is larger than that transmitted by the second speed clutch in a half-engaged state.

13. The transmission control method for a vehicle as claimed in claim 12, wherein when the second direction clutch and the second speed clutch in a half-engaged state are fully engaged in the second step, they are gradually brought into full engagement, and the full engagement of the second direction clutch is established prior to the full engagement of the second speed clutch.

14. The transmission control method for a vehicle as claimed in claim 5, 6, 11, 12 or 13, wherein the first direction clutch is a forward drive clutch and the second direction clutch is a reverse drive clutch.

15. The transmission control method for a vehicle as claimed in claim 5, 6, 11, 12 or 13, wherein the first direction clutch is a reverse drive clutch and the second direction clutch is a forward drive clutch.

16. The transmission control method for a vehicle as claimed in any one of claims 1, 2, 3, 5–9 and 11–13, wherein the first speed clutch is a first drive clutch and the second speed clutch is a second drive clutch.

17. The transmission control method for a vehicle as claimed in any one of claims 1, 2, 3, 5–9 and 11–13, wherein the first speed clutch is a second drive clutch and the second speed clutch is a first drive clutch.

18. The transmission control method for a vehicle as claimed in claim 1, 7 or 11, wherein the direction clutches and the speed clutches are multiple disc clutches which are pressed for engagement or released for disengagement by oil pressure.

19. The transmission control method for a vehicle as claimed in claim 4 or 7, wherein the direction clutches are load clutches.

20. The transmission control method for a vehicle as claimed in claim 9 or 13, wherein the speed clutches are load clutches.

21. The transmission control method for a vehicle as claimed in claim 1, 7 or 11, wherein the vehicle is a construction vehicle comprising at least two drive ranges in forward and reverse respectively.

22. The transmission control method for a vehicle as claimed in claim 5, wherein the engagement of the second direction clutch is gradually carried out, starting upon completion of the half-engagement of the first speed clutch to be disengaged.

23. The transmission control method for a vehicle as claimed in claim 11, wherein the engagement of the second direction clutch is gradually carried out, starting upon completion of the half-engagement of the first direction clutch.

* * * * *